(12) United States Patent
Satoh et al.

(10) Patent No.: US 6,558,438 B1
(45) Date of Patent: May 6, 2003

(54) METHOD FOR PRODUCING A PRESSURIZED PACKAGE FOR A FILM PACKED BATTERY

(75) Inventors: Masaharu Satoh, Tokyo (JP); Norihide Ohyama, Tochigi (JP); Masato Shirakata, Tokyo (JP); Tomokazu Kumeuchi, Tokyo (JP); Hiroshi Yageta, Tokyo (JP); Ryuichi Shimizu, Tochigi (JP); Yutaka Bannai, Tokyo (JP)

(73) Assignees: NEC Corporation, Tokyo (JP); NEC Tokin Tochigi, Ltd., Tochigi (JP)

( * ) Notice: Subject to any disclaimer, the term of this patent is extended or adjusted under 35 U.S.C. 154(b) by 0 days.

(21) Appl. No.: 09/620,816

(22) Filed: Jul. 21, 2000

(30) Foreign Application Priority Data

Jul. 23, 1999 (JP) .............................. 11-209401
Apr. 14, 2000 (JP) ....................... 2000-113622

(51) Int. Cl.[7] .................... H01M 6/10; H01M 10/04; H01M 10/44
(52) U.S. Cl. ................... 29/623.1; 429/94; 429/127
(58) Field of Search ................ 429/162, 163, 429/127, 94; 29/623.1

(56) References Cited

U.S. PATENT DOCUMENTS 4,681,663 A 7/1987 Seiger 5,670,272 A 9/1997 Cheu et al.

FOREIGN PATENT DOCUMENTS

| FR | 2 425 733 | 12/1979 |
|---|---|---|
| GB | 2105512 A | 3/1983 |
| JP | 58-73968 | 5/1983 |
| JP | 5-182649 | 7/1993 |
| JP | 11-111339 A | * 4/1999 |
| JP | 11-339853 A | * 12/1999 |
| JP | 2001-35523 | 2/2001 |
| WO | WO 98/02932 | 1/1998 |
| WO | WO 99/05743 | 2/1999 |

OTHER PUBLICATIONS

Patent Abstracts of Japan, Takabayashi Hisaaki, "Charging Method and Charging Device for Sealed Storage Battery", Publication No. 06111850, Apr. 22, 1994.

Patent Abstracts of Japan, Okada Mikio, "Lithium Secondary Cell", Publication No. 09259929, Oct. 3, 1997.

* cited by examiner

*Primary Examiner*—Patrick Ryan
*Assistant Examiner*—Susy Tsang-Foster
(74) *Attorney, Agent, or Firm*—Choate, Hall & Stewart (57) ABSTRACT

In a film packed battery, a battery power source comprising, at least, a cathode, an anode, an electrolyte, and a separator is packed with a film. In a method for producing film packed battery, a pre-charging step for charging the film packed battery while pressure is applied, for example, by sandwiching it between two flat plates is included at least once.

15 Claims, 8 Drawing Sheets

(A) THIN BATTERY PRODUCED BY THE METHOD ACCORDING TO THE PRESENT INVENTION (B) THIN BATTERY PRODUCED BY THE PRIOR METHOD

FIG. 5

(A) THIN BATTERY PRODUCED BY THE METHOD ACCORDING TO THE PRESENT INVENTION (B) THIN BATTERY PRODUCED BY THE PRIOR METHOD

METHOD FOR PRODUCING A PRESSURIZED PACKAGE FOR A FILM PACKED BATTERY

BACKGROUND OF THE INVENTION

1. Field of the Invention

The present invention relates to a method for producing a film packed battery whereby a battery power source comprising a cathode, an anode, an electrolyte and a separator are packed with a heat sealable film, and in detail, a method for producing a film packed battery which is prevented from deformation during charge and discharge processes with excellent stability.

2. Description of the Prior Art

With increasing the number of the notebook computer and mobile phone, there is an increased demand for developing a battery with high power and excellent stability. In order to meet demand, a secondary battery utilizing electrochemical reaction of alkaline metal ions such as lithium ions has been developed. This type of a secondary battery is comprised in that an anode active material layer and cathode active material layer are separated by a separator made of a porous film and wound or stacked, and then enclosed in a metal can case.

A prismatic battery which can be efficiently mounted on various electronic equipment has been also developed. Such prismatic battery is formed in that the electrodes-separator stacked layers are prismatically wound, pressed by using flat plates, and packed in a metal case. However, recently, there are also demands for electronic equipment including its package materials to be miniaturized and made lightweight, and to make its package thinner and lighter is demanded However, a battery packed with the metal case is heavy because the case is required to be thick and stiff, and it is barely made thinner than 4 mm in terms of case formation, and therefore, to meet such demands was difficult.

Therefore, a package comprising a heat sealable film has been examined. This film is made by disposing, on the exterior surface of metallic foil such as aluminum, a resin such as nylon and polyester having high mechanical strength and, on the interior surface, a resin such as polyethylene and polypropylene having a heat sealable property and an excellent chemical stability. Further, inside the package, a battery comprising cathode active material layer and anode active material layer which are separated by a separator made of a porous film and wound or stacked is placed, the interior surfaces are put together and heat sealed, and thus a battery is produced.

However, there are such problems in that, the battery packed with the heat sealable film cannot suppress deformation of the battery power source by itself and thus, even when the battery power source is slightly expanded or the internal pressure is slightly increased, deformation occurs. In general, it is important for battery properties such as energy density, capacity, current density, impedance, and cycle life that the cathode active material layer and anode active material layer are in close and uniform contact via the separator. Therefore, when expansion or deformation of the battery power source occurs, impedance increases, whereby discharge capacity decreases, and cycle characteristics deteriorate.

With respect to the problems, for example, in Japanese Laid-open Patent Publication No. 5-182649 of 1993, a method for maintaining airtightness of a battery power source comprising an anode, a cathode, an electrolyte, and suppressing deformation by maintaining the inside of a heat sealable film at a pressure lower than atmospheric pressure is disclosed. Nonetheless, even when the inside of the battery is maintained at the pressure lower than atmospheric pressure, since the force for pressing the battery power source is 1 atm. at most, it is insufficient for prevention of deformation and also, when the internal pressure is increased due to generation of a gas, no effect is provided.

SUMMARY OF THE INVENTION

The object of the present invention is to provide a simple and easy method for producing a film packed battery, which is excellent in stability, that is, deformation due to charge and discharge is small, and it is unlikely that deformation and breakage of the battery occurs even when the internal pressure increases, and in particular, a simple and easy method suitable for producing a thin and lightweight film packed battery.

Another object of the present invention is to provide a manufacturing method of a prismatic battery that reduces quality variations even when pressured charging is simultaneously performed on a plurality of batteries by use of one pressing apparatus having a simple structure The first aspect of the present invention relates to a method for producing a film packed battery whereby a battery power source comprising, at least, a cathode, an anode, and a separator are packed with a heat sealable film, wherein a pre-charging step for charging while pressure is applied is included at least once.

The second aspect of the present invention relates to a method of manufacturing a prismatic battery, comprising at least one pre-charging step in which at least one prismatic battery is sandwiched between a pair of pressing plates having a buffer layer at least on one of the pressing plates, and under a condition where the interval between the pressing plates is fixed at a predetermined interval that enables pressing of the prismatic battery, the prismatic battery is charged while pressure is being applied to the prismatic battery.

As the buffer layer, for example, a rubber resilient member in a sheet form is used. Furthermore, the buffer layer may comprise at least two layers of a high hardness layer and a low hardness layer. In this case, the high hardness layer is disposed so as to be in contact with the prismatic battery. At this time, it is preferable that the low hardness layer be a rubber resilient member in a sheet form, and it is preferable that the high hardness layer be made of a metal sheet or a resin sheet being harder than the low hardness layer.

Moreover, the present Invention is particularly advantageous when a plurality of prismatic batteries is sandwiched between the pair of pressing plates in the pre-charging step to simultaneously manufacture a plurality of prismatic batteries.

According to examination by the inventors, it was proved that after packing the battery power source with the heat sealable film, by charging at least once while pressure is applied, deformation due to charge and discharge in use thereafter is small. It is understood that, for the film packed battery produced by the method according to the invention, the internal strains due to charge are averaged over the whole battery, and deformation is also suppressed when charging and discharging thereafter Therefore, possibilities such as detachment between the collector and electrode layer or between electrode layer and separator and breakage of the separator caused by deformation of the battery power source, and an increase in impedance, decrease in capacity or charge and discharge efficiency, and internal short circuit resultant therefrom can be reduced.

As has been described, according to the present invention, the film packed battery, which is excellent in stability and safety, that is, there is little possibility of deformation and breakage of the battery even when the internal pressure is increased through use, can be simply and easily produced. The production method according to the present invention is extremely efficient especially when a thin and lightweight battery is produced.

According to the present invention, a film packed battery in which the possibility of deformation and breakage of the battery is small even when the internal pressure is increased through use, deterioration of various characteristics, in particular, deterioration of cycle characteristics is small, and which is excellent in stability and safety can be easily produced even when the internal pressure is increased through use.

DETAILED DESCRIPTION OF THE PREFERRED EMBODIMENTS

Now there will be described embodiments of a first aspect of the present invention. In the invention, the battery power source comprises the cathode, anode, and separator, and for each, materials conventionally well-known as elements composing a secondary battery are utilized.

For the cathode, the material is not particularly limited as far as it absorbs positive ions or emits negative ions during discharge, and for example, materials, which are conventionally well-known to be used for the cathode active materials of the secondary battery, such as metal oxides including $LiMnO_2$, $LiMn_2O_4$, $LiCoO_2$, and $LiNiO_2$, conducting polymers including polyacethylene, polyaniline, polypyrrole, polythiophene, and polyparaphenylene, derivatives thereof, and disulfide compounds can be used.

Further, for the anode, the material is not particularly limited as far as it can absorb and emit cations, which are conventionally well-known as the anode active materials of the secondary battery, such as polycrystalline carbons such as graphitized carbon obtained by heat-treating natural graphite, coal, and petroleum pitch at a high temperature, amorphous carbon obtained by heat-treating coal, petroleum pitch coke, and acetylene pitch coke, and lithium alloys such as metal lithium and AlLi can be used.

Moreover, according to the present invention, when forming the electrodes, the electrode layers can be formed by mixing these electrode active materials with an appropriate binder and high-performance material. For the binder, a halogen-containing polymer such as poly(vinylidene fluoride) is used, and for the high-performance material, conductive polymers such as acetylene black, polyoyrrole, and polyaniline, polymer electrolyte and complexes thereof are used.

In the present invention, the collector is not particularly limited and, for example, a metal foil or a metal mesh having high conductivity and excellent malleability is used. For such collectors, for example, an aluminum foil is preferable in the case of the cathode and a copper foil is preferable in the case of the anode, and the thickness is, for example, 5 to 50 $\mu$m. To these collectors, an active material layer is bonded by the binder.

For the electrolyte contained in the battery power source of the present invention, materials such as an electrolyte solution, a polymer solid electrolyte, and a polymer gel electrolyte, which are conventionally well-known as the electrolyte of the secondary battery, can be used. The salts dissolved in the electrolyte are, for example, alkali metal salts such as Li, K, and Na or halogen-containing compound anions such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$, and $(C_2F_5SO_2)_3C^-$. These electrolyte salts can be used alone or plurally in a combined manner.

For the electrolyte solution, for example, solutions in which above mentioned electrolyte salts are dissolved in aprotic solvents such as ethylene carbonate, propylene carbonate, butylene carbonate, dimethyl carbonate, ethyl methyl carbonate, diethyl carbonate, acetonitrile, dimethoxyethane, sulfolane, tetrahydrofuran, γ-butyrolactone, N-methyl-2-pyrrolidone, and dimethylformamide are used.

For the polymer solid electrolyte, for example, polyether polymers such as polyethylene oxide and polypropylene oxide containing the above mentioned electrolyte salts are used.

Also, for the polymer gel electrolyte, for example, polymers, in which the above mentioned electrolyte salts and the solvents enumerated as the aprotic solvents usable for the aforementioned electrolyte solutions are contained, such as fluoropolymers including poly(vinylidene fluoride), poly(hexafluoropropylene), and poly (tetrafluoroetnylene); acrylate polymers including poly(methyl methacrylate) and poly(methyl acrylate); and poly(acrylonitril) can be used. In particular, polymers which are combined by copolymerization can also be used.

Furthermore, for the porous separator used in the present invention, in general, a microporous separator is employed, however, a woven fabric or a non-woven fabric may be used as far as the effects of the present invention can be provided. For the micoporous separator, for example, a micoporous separator having a hole diameter of 0.1 to 5 $\mu$m, a hole area rate of 30% to 70%, and a thickness of 1 to 50 $\mu$m can be used. As the material of the separator, polyolefin resins such as polyethylene and polypropylene and polyester can be used.

Figure 1:
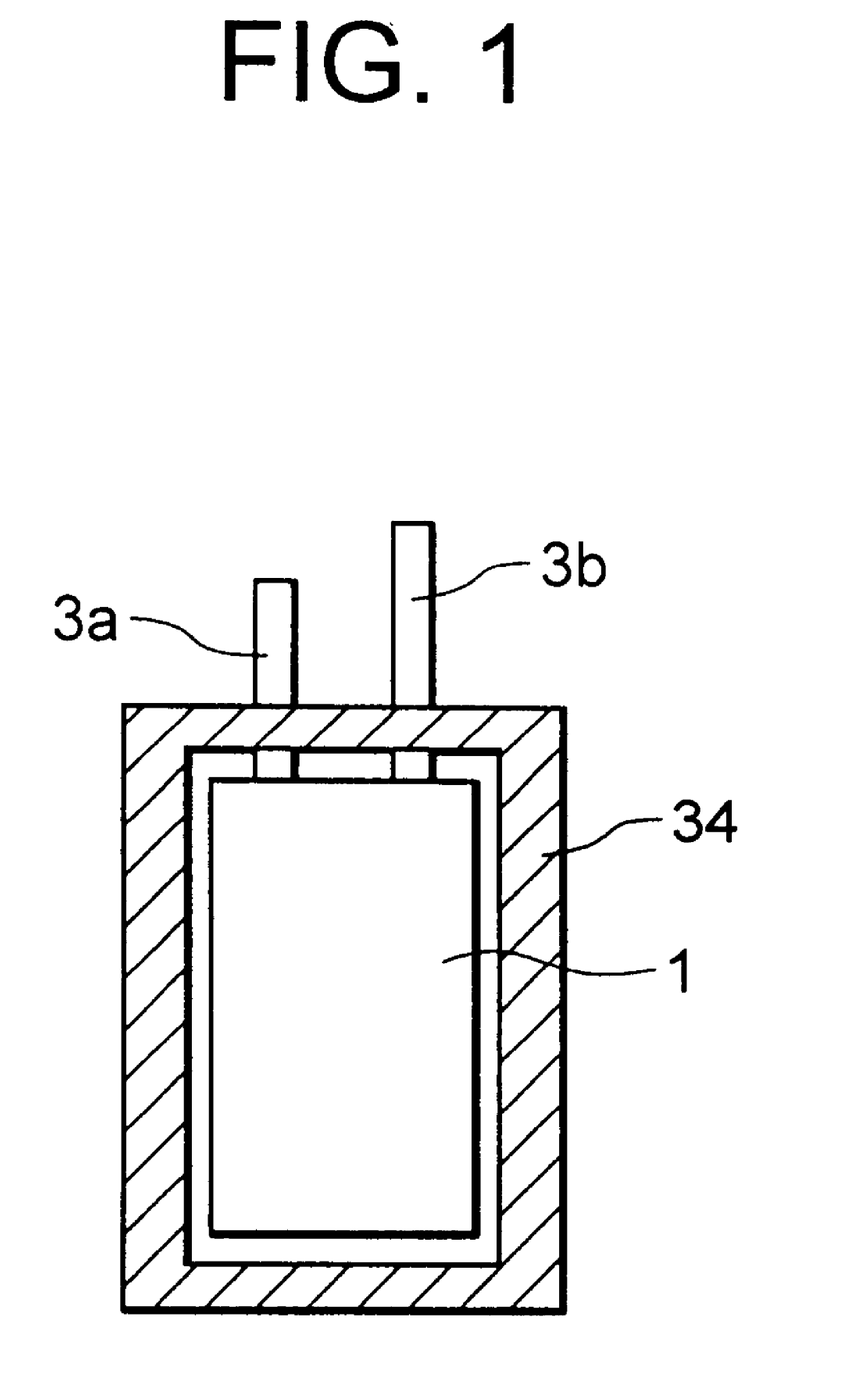
FIG. 1 is a view schematically showing a condition where a battery power source is packed with a heat sealable film.

In the present invention, the shape of the battery power source Is not particularly limited and may have a cylindrical shape, however, for reasons of making thin and lightweight and ease of sealing, the shape of a flat plate is preferable and a prismatic shape is preferable as shown in FIG. 1. The prismatic shape includes a laminated type wherein many cathodes and anodes are stacked via separators and a winding type wherein the cathode, anode, and separator are wound.

The battery produced by the present invention is thin and lightweight and which comprises said battery power source packed with a film. For the heat sealable film, a film such that its periphery can be sealed after the battery power source is placed therein is preferable, and at least its sealing portion can be heat sealed. For example, the entire film may be formed of a film with a heat seal property composed of polyolefin resins such as polyethylene and polypropylene, or, if necessary, the film may be made into a multi-layered structure and the innermost layer may be made of a resin layer with a heat sealable property.

Preferably, such a multi-layered film may be composed of at least three layers of a surface protection layer, a metallic layer, and a heat sealable layer and, wherein for the surface protection layer, a resin layer of a resin which does not melt at a heat seal temperature, such as, for example, poly (ethylene terephthalate), nylon, and polyimide, is used. Also, for the metallic layer, to use a metal, which has few cracks and pinholes and does not allow any kind of gas to permeate such as, for example, a foil of aluminum, nickel, and gold, is preferable. The thickness of the metallic layer is not particularly limited in the present invention, however, if the layer is too thin, pinholes are likely to occur, and therefore, in general, it is used in the range of 0.015 to 0.1 mm. The heat sealable layer is not particularly limited as long as it is barely encroached by the electrolyte solution, has thermoplastic characteristics, and can be thermal-deposited in the range of 150 to 250° C., polyolefin resins such as polyethylene and polypropylene, polyimide resins, and ionomer are used.

In addition, in the present invention, adhesion between thermoplastic resin film and metal foil can be enhanced by using a adhesive layer or by performing surface modification treatment.

Then, one example of a producing method of the present invention is explained with reference to the drawings.

Figure 2:
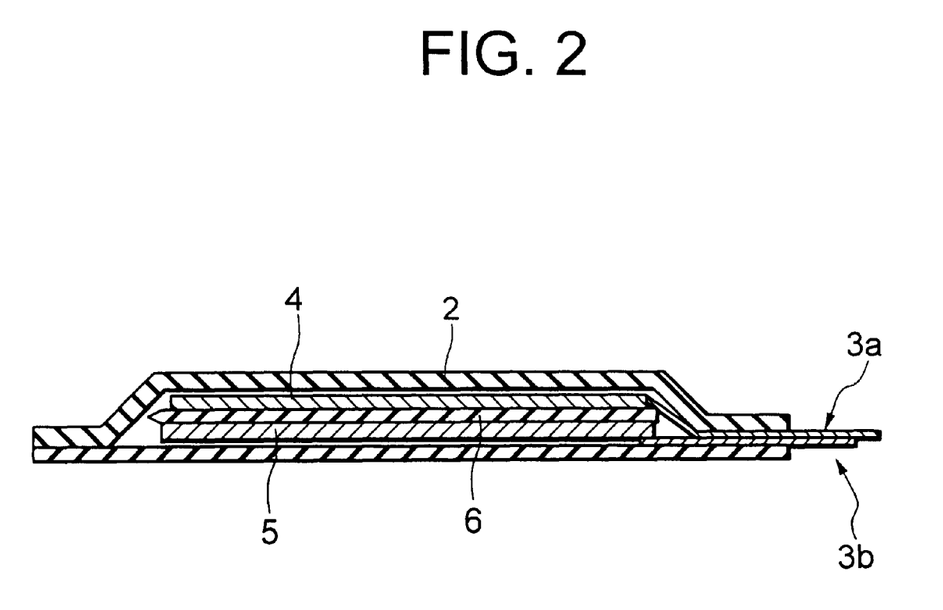
FIG. 2 is a sectional view schematically showing a condition where a battery power source is packed with a heat sealable film.

In this example, as shown in FIG. 1 and FIG. 2, a battery power source 1 comprising a cathode 4, an anode 5, and a separator 6 is first packed with a shaped laminated film 2, and the periphery (a heat sealable region 34) is heat sealed. At this time, externally withdrawn electrodes 3a and 3b are arranged so as to be extended, respectively.

In the pre-charging step of the present invention, while pressure is applied to the uncharged battery thus formed, the battery is charged.

Figure 3:
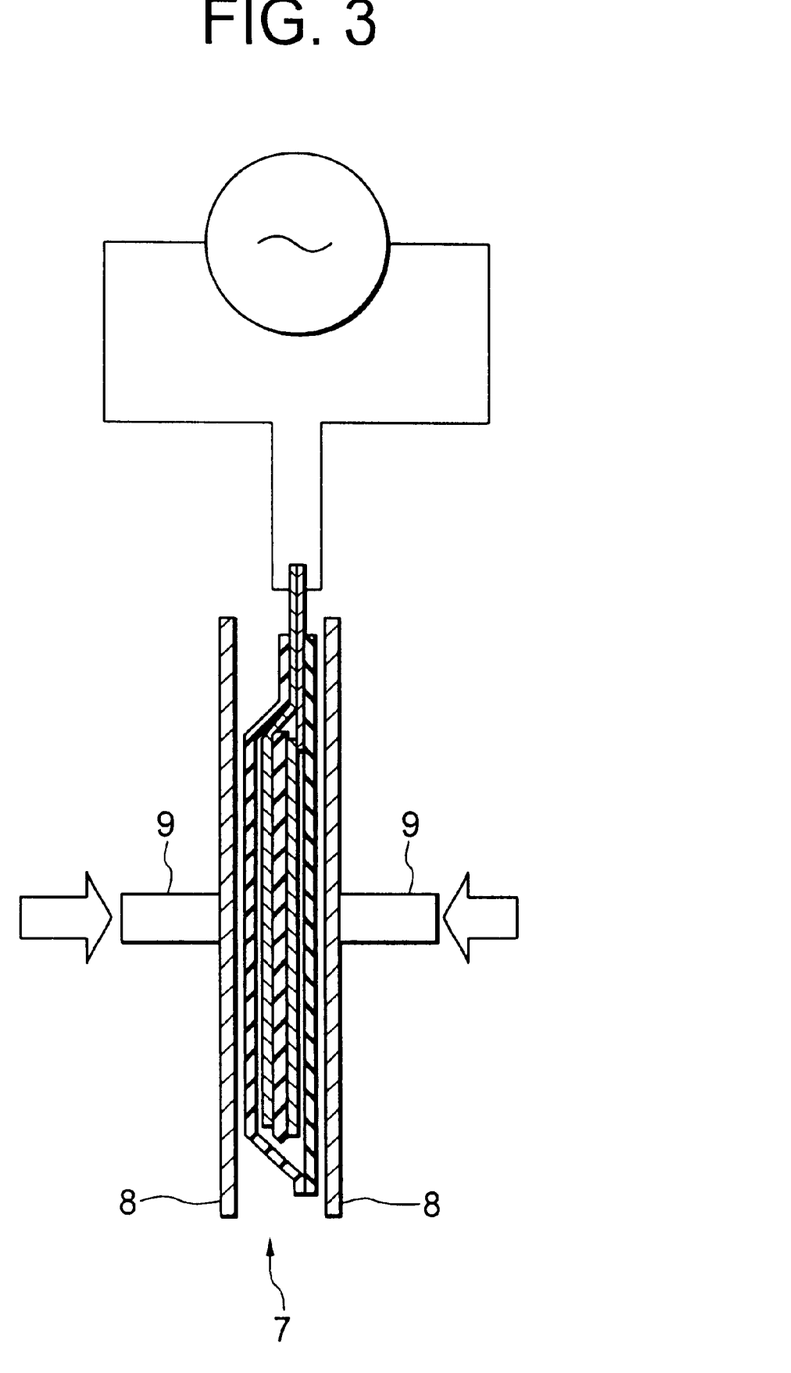
FIG. 3 is a view schematically showing a condition where a battery is charged while being pressured from both sides for pre-charging.

An example thereof is shown in FIG. 3. According to the method, a battery (before charging) 7 is sandwiched by two plates 8 opposed to each other, and while pressure is applied to the flat plates via springs 9, charging is carried out for the externally withdrawn electrodes at a constant current and a constant voltage.

The materials used for the plates for sandwiching the battery (before charging) is not particularly limited, and the plates made of metal, glass, and plastic are used, however, from a standpoint to reduce the possibility of shortcircuit between the battery and terminal, insulation glass, plastic, and a metal plate coated by plastic are preferable. In addition, according to the invention, the thickness and shape of these plates are not particularly limited hereto, and are appropriately selected in accordance with the shape of the battery power source or deforming force.

In the present embodiment, the pressure applied to the battery can be selected in accordance with the capacity and shape of the battery. It is selected in the range where the battery power source is sufficiently suppressed and the separator within the battery power source does not break. In general, for a battery power source which is likely to be deformed, applying high pressure is preferable and, for example, the more the electrodes are stacked, the higher the pressure to be applied. In order to suppress deformation of the battery power source, in general, the pressure of 0.05 MPa or more is necessary and, preferably, 10 MPa or less.

In detail, for a battery having a capacity of 600 mAh and size of approximately 30×60 mm, which is used in, for example, a mobile phone wherein deformation of the battery power source is small, a pressure in the range of 0.05 MPa to 1 Mpa is preferable. For a battery having a capacity of 1600 mAh and size of approximately 35×65 mm, which is used in, for example, a notebook computer wherein the battery power source is likely to deform, a pressure in the range of 0.5 MPa to 10 Mpa is preferable.

Furthermore in order to prevent the battery power source to be excessively pressed and, as a result, the electrode layer and separator breaks, it is preferable to provide a means able to relieve the excessive pressure. For example, the clearance between the plates is not preferably fixed so that excessive pressure is not applied when the battery expands and, therefore, it is preferable to interpose resilient members such as a hydraulic cylinders and springs between the flat plates and pressure generating device.

In addition to such method using the plates, as another pressing method in the pre-charging step, there is a method utilizing hydrostatic pressure, that is, a method using a fluid for pressing the battery from the boundary between the battery and fluid in the vertical direction. For example, it can be carried out in a manner such that the uncharged battery is placed in a pressurizing container, and with liquids and gases filled so as to press. Even in this case of another method, the pressure to be applied can be appropriately changed in accordance with the capacity and shape of the battery in the same manner as for the flat plates, however, it is necessary to use a pressure which dose not cause deformation, that is, preferably 0.05 MPa or more. At the same time, it is necessary that the pressure is at a degree whereby a separator is not crushed For example, a battery having a capacity of 600 mAh and size of approximately 30×60 mm, which is used in, for example, a mobile phone, is pressurized in the range of 0.05 MPa to 1 MPa similar to the above. The liquid used to apply hydrostatic pressure is not particularly limited as far as it is stable at a temperature where a battery is produced, however, to be easily carried out, insulation liquids such as silicon petroleum and ultrapure water are preferable. In such liquids, the battery is soaked and charged by supplying the externally withdrawn electrodes with a predetermined current and voltage while hydrostatic pressure is applied.

Then embodiments of the second aspect of the present invention will be described. With respect to the problem of deterioration due to repetitive charge and discharge and deformation of the battery power sources, the previous embodiments proposed a method of suppressing the deformation. According to the method or the previous embodiments, in manufacturing a battery in which the battery power sources are packed with a heat sealable film, after manufacturing, the battery is pre-charged while pressure is applied thereto at least once, thereby suppressing the deformation due to charge and discharge involved in using the battery thereafter. It is considered that in a film packed battery manufactured by this method, since the internal strain involved in charging is averaged over the entire battery, the deformation is suppressed in charge and discharge performed thereafter. For this reason, the possibility of, for example, exfoliation of the collector and the electrode layers or the electrode layers and the separator and breakage of the separator due to deformation of the battery power sources, and resultant impedance increase, capacity reduction, charge and discharge efficiency reduction and internal short-circuit can be reduced, so that a film packed battery being excellent in stability and safety can be manufactured.

The second aspect of the present invention provides an improvement in such a method of charging a battery while applying pressure thereto after the battery is manufactured (hereinafter, referred to as pressurized pre-charging method).

As mentioned above, the inventors of the present invention have found that by pre-charging a battery while applying pressure thereto at least once after the battery is manufactured (pressurized pre-charging), deformation due to charge and discharge involved in using the battery thereafter can be suppressed. However, it has been found that it is necessary to give further consideration to the pressing apparatus, etc. particularly in applying this method to a plurality of prismatic batteries.

That is, if excessive pressure is applied to the battery power sources during pressurized pre-charging, there is a possibility that the electrode layers and the separator are damaged. For example, when a film packed battery is directly sandwiched between a pair of rigid flat plates without any buffer layer being provided in between and the pressured charging method is applied to the battery by use of an apparatus that fixes the pair of flat plates at a predetermined interval, since a force for the battery to expand acts as the battery is charged (or charged and discharged), the pressing force gradually increases, so that there is a possibility that an excessive pressure is applied to the battery power sources. In order that no excessive pressure is applied to the battery, it is desirable to provide a pressure buffer means in the pressing apparatus.

When the pressurized pre-charging method is applied to a plurality of batteries for mass production, if a plurality of batteries arranged to be flat between a pair of rigid flat plates is simultaneously pressed, force concentrates on the thickest battery, so that the force applied to the other batteries is weaker. That is, the effect of the pressured charging method varies due to slight thickness variations among the batteries, so that there is a possibility that quality variations increase. The variations can be prevented by providing flat plates for each battery. However, in that case, it is necessary that the means for applying pressure to the flat plates be also provided for each battery, which complicates the apparatus.

Therefore, according to the present invention, by applying the pressured charging method with the prismatic battery being sandwiched between a pair of pressing plates having a buffer layer at least on one of the plates, excessive pressure can be prevented from being applied to the battery power sources even when a force for the battery to expand acts as the battery is charged (or charged and discharged).

Moreover, when the pressurized pre-charging is performed on a plurality of batteries for mass production, since the buffer layer reduces the slight thickness variations among the batteries, force is uniformly applied to the batteries. As a result, a prismatic battery with minimized quality variations can be obtained.

Hereinafter, embodiments of the present invention will be detailed with reference to the drawings.

Figure 6:
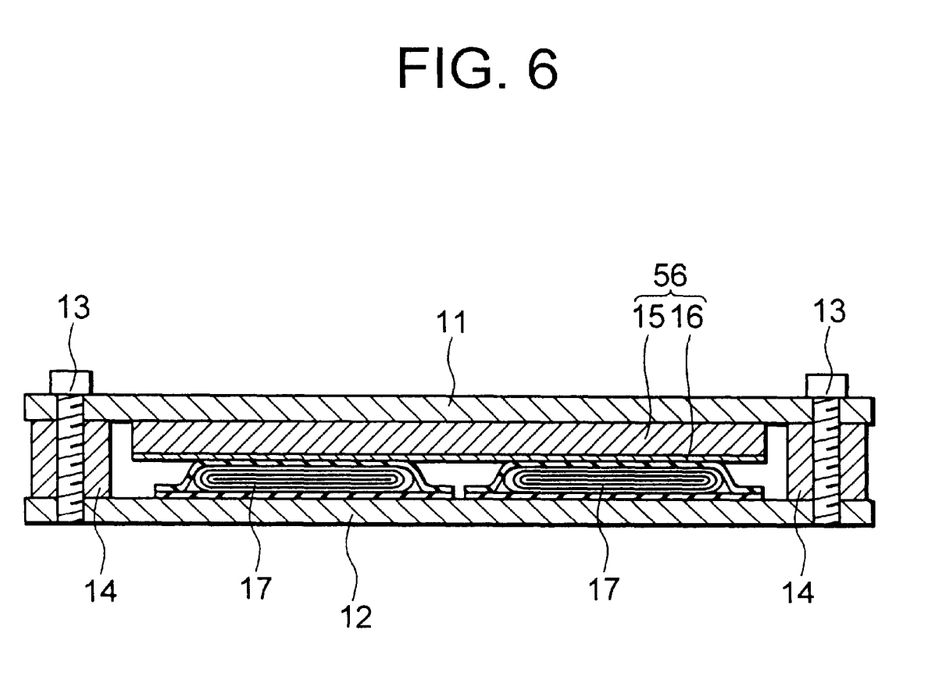
FIG. 6 is a view schematically showing an pressing apparatus used when pressurized pre-charging is performed on a plurality of film packed batteries.

FIG. 6 schematically snows an example of an apparatus for embodying a method of the present invention. An upper pressing plate 11 and a lower pressing plate 12 are fixed at a predetermined interval by spacers 14 and screws 13. On the lower pressing plate 12, a plurality of film packed batteries 17 in which flattened winding type battery power sources are packed with a film is placed. The film packed batteries 17 are pressed by the upper pressing plate 11 to which a buffer layer 56 comprising a high hardness layer 16 and a low hardness layer 15 is attached. The high hardness layer 16 is in contact with the film packed batteries 17 so as to cover them. The high hardness layer 16 is attached to the low hardness layer 15 having substantially the same size as the layer 16 (having a size that covers the plurality of film packed batteries). The low hardness layer 15 is attached to the upper pressing plate 11. The high hardness layer 16 is made, for example, of a thin, hard and deformable member such as a metallic sheer with a thickness of several hundreds of microns. The low hardness layer 15 is made, for example, of a rubber resilient member in a sheet form with a thickness of several millimeters. The interval between the upper pressing plate 11 and the lower pressing plate 12 is such that the low hardness layer 15 is slightly shrunken. Because of the resilience of the shrunken low hardness layer, the film packed batteries 17 receive a pressing force between the lower pressing plate 12 and the high hardness layer 16.

In this structure, since the low hardness layer is deformed in accordance with slight thickness differences among the film packed batteries (in this case, the high hardness layer is also deformed), it never occurs that a high pressure is applied only to the thickest film packed battery or that an insufficient pressure is applied to the thinnest film packed battery. This enables pressure to be applied in accordance with the thickness variations among the batteries. Further, a plurality of film packed batteries can be simultaneously pressed with a pair of pressing plates fixing means comprising, for example, only spacers and screws, one rubber sheet and one metallic sheet, a multiplicity of prismatic batteries can be simultaneously pressed although the apparatus has a simple structure.

It is desirable that the upper pressing plate and the lower pressing plate have a rigidity sufficient for the plates not to be deformed by pressure. As the material therefor, a metal is desirable.

Although not specifically limited, it is desirable that the thickness of the low hardness layer be not less than 0.1 mm. This is because no pressure buffer effect is obtained if the low hardness layer is too thin. While there is no specific upper limit to the thickness and the thickness may be, for example, approximately 50 mm, it is generally not more than 30 mm. It is desirable that the hardness of the low hardness layer be such that a shrinkage of 0.01 mm to 3 mm, preferably, a shrinkage of 0.1 mm to 1 mm is caused for the application of a stress or $1 \times 10-3 N/m2$ in a case where the low hardness layer is made, for example, of a rubber sheet with a thickness of 5 mm. As the material therefor, various rubbers can be used such as urethane rubber, expanded urethane rubber; fluororubber such as (vinyliden fluoride-hexafluoropropylene) copolymer, silicone rubber, silicone sponge rubber, SBR, NBR, natural rubber, EPDM, chloroprene rubber, nitrile rubber and acrylic rubber. Sponge bodies of various polymers and an air bag can be used as well.

It is desirable that the high hardness layer 16 provided in the example of FIG. 6 have a sheet form being harder and thinner than the low hardness layer 15. It is also desirable that the surface of the high hardness layer 16 be flat. Examples of usable materials include sheets of resins such as polyester, polypropylene, polyethylene, acrylic resin and silicone resin, and metallic sheets. Moreover, of the materials cited as rubber materials that can be used for the low hardness layer, ones that are harder than the low hardness layer can be used for the high hardness layer.

Figure 7:
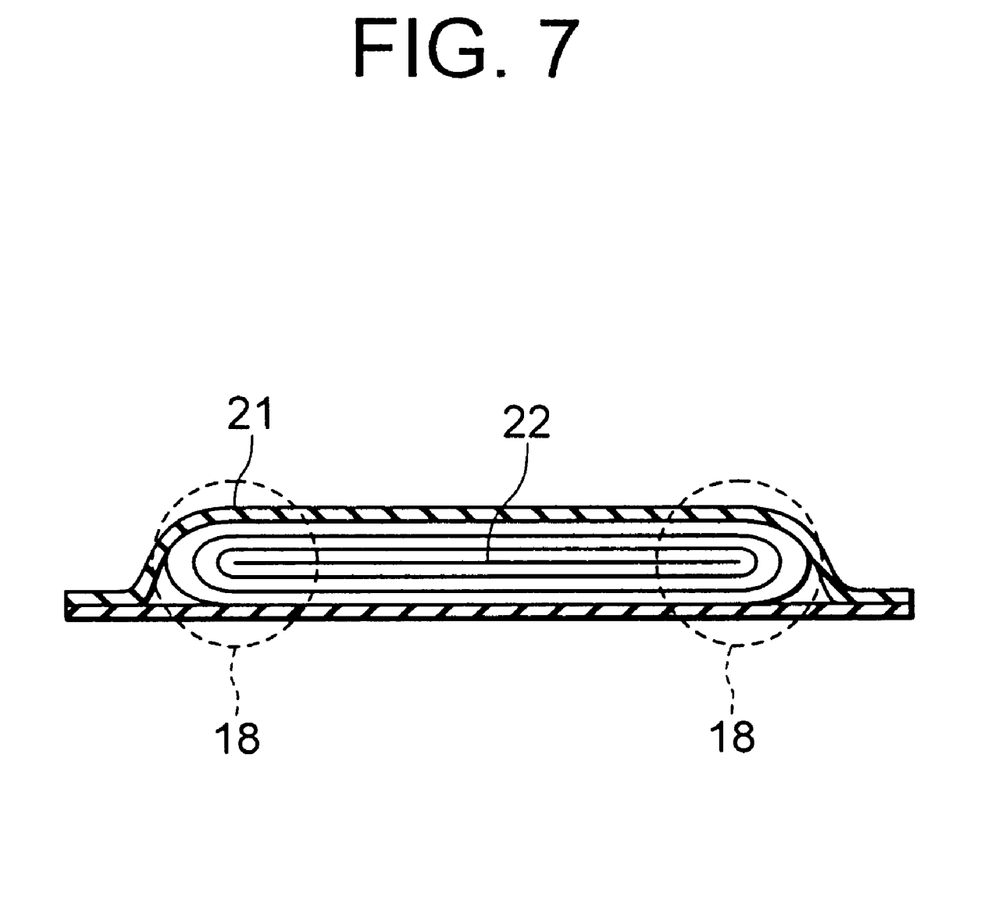
FIG. 7 is a view schematically showing a cross section of an example of the film packed battery.
Figure 8:
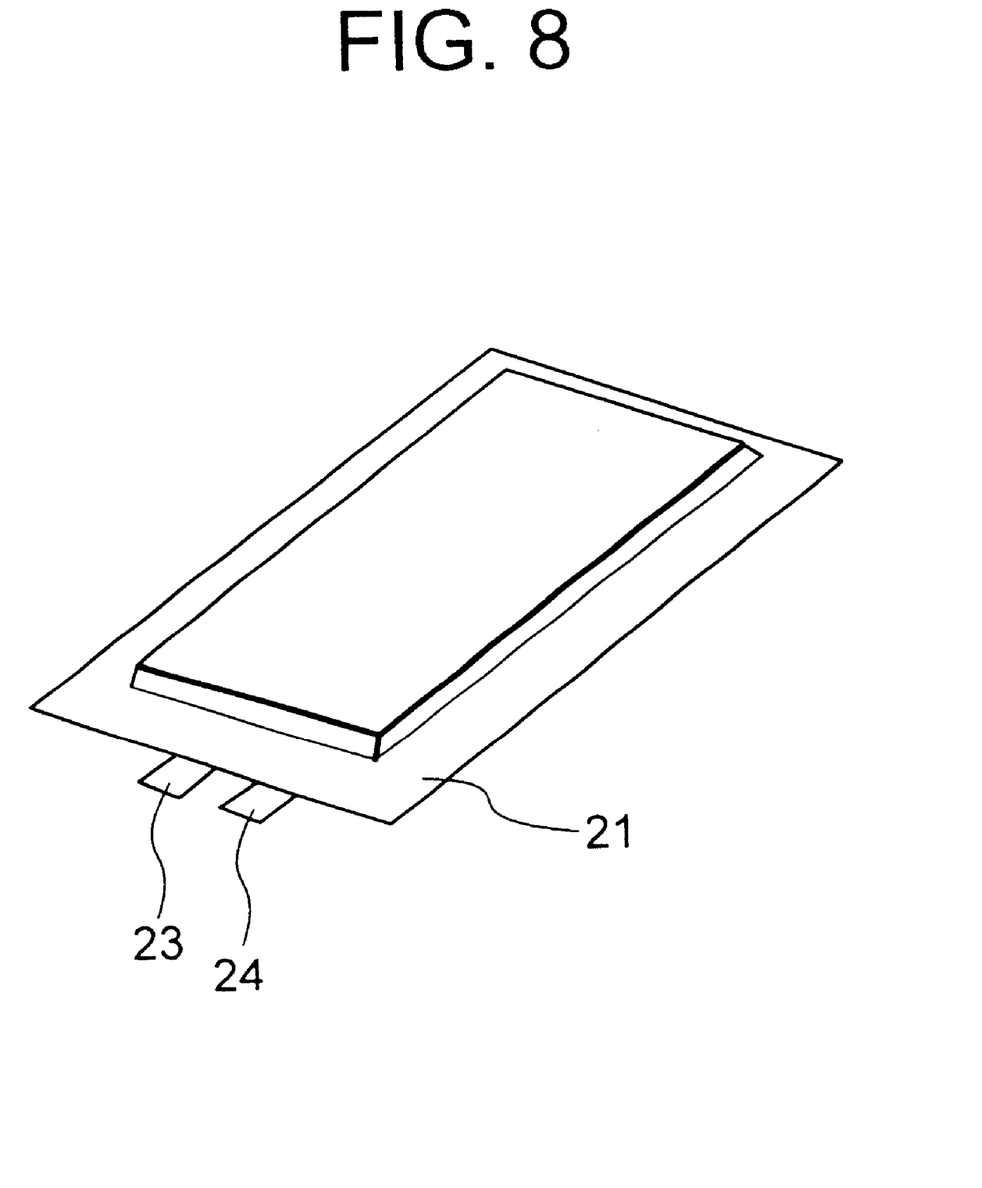
FIG. 8 is a view schematically showing a general view of the example of the film packed battery.

The high hardness layer 16 produces the following effects: For example, in a film packed battery that houses flattened winding type battery power sources, the bending portions 18 (see FIG. 7) of the electrode sheet are apt to expand in the direction of thickness of the battery due to charge compared with other portions, and since the sheathing member is a flexible film, these portions are apt to locally expand also in the outside shape of the battery such a local expansion is undesirable in placing the battery in a small space in an electronic apparatus, and it is desirable that the battery surface be flat. Because of the presence of the high hardness layer 16 in the pressing apparatus, such a local expansion of the battery can be suppressed, so that the flatness of the surface of the film packed battery can be maintained even though the battery is charged. Further, since the high hardness layer 16 has a thin sheet form, it can be deformed in accordance with the deformation of the low hardness layer 15 caused in accordance with slight thickness differences among the film packed batteries. That is, suppression of a small-size battery deformation such as a local expansion in a battery and flexible handing of thickness differences among separate parts such as thickness differences among batteries are compatible with each other.

It is desirable that the thickness of the high hardness layer be 0.05 mm to 1 mm in a case where the high hardness layer is made, for example, of a metallic sheet. In the case where the high hardness layer 16 is made of a metallic sheet, if it is too thin, the flexibility is excessive, so that local expansion in the battery cannot be sufficiently suppressed. Moreover, in the case where the high hardness layer is made of a metallic sheet, if it is too thick, the deformation of the metallic sheet cannot cope with the thickness differences among the batteries, so that the strongest force acts on the thickest battery and weaker forces act on the other batteries. Consequently, the effect of the pressured charging method varies due to slight thickness variations among the batteries. This increases quality variations. In a case where the high hardness layer is made of a resin sheet, it is desirable that the thickness thereof be approximately 0.1 to 5 mm. In the case where the high hardness layer is made of a metallic sheet, a protective member for preventing short-circuits may be provided in each of the parts of the metallic sheet situated at the electrode leads in the portions where the batteries are to be placed. Moreover, the high hardness layer and the low hardness layer may be integrated by being bonded together or may be not integrated.

In FIG. 6, terminals for connection to the electrode leads of the batteries may be provided on the upper or the lower pressing plates.

The buffer layer may be provided between the upper pressing plate and the portions where the batteries are to be placed, between the lower pressing plate and the portions where the batteries are to be placed, or in both.

While the buffer layer comprises the high hardness layer and the low hardness layer in the above-described example, the buffer layer may include only one layer In that case, it is desirable that the layer be made of the rubber resilient member cited as a material of the low hardness layer.

While film packed batteries are used in the above-described example, the effect of the present invention is also obtained when batteries packed with angular metallic case or angular resin cases are used as long as pressure can be externally transmitted to the battery power sources.

While batteries having winding type battery power sources are used in the above-described example, for batteries whose performance gradually deteriorates due to internal strain such as deformation of the battery power sources caused by repetitive charge and discharge, the effect of the present invention is also obtained when batteries having a different structure, such as batteries having flat electrode laminated type battery power sources, are used.

The battery power sources used for the prismatic battery of the present invention include known materials such as the cathode, the anode, the electrolyte, and the separator as required. For example, the following are included:

The material of the cathode is not specifically limited as long as it absorbs positive ions or emits negative ions at the time of discharge, and ones previously known as materials for the cathode of a secondary battery can be used such as metallic oxides such as $LiMnO_2$, $LiMn_2O_4$, $LiCoO_2$ and $LiNiO_2$, conductive polymers such as polyacetylene, polyaniline, polypyrrole, polythiophene and polyparaphenylene and derivatives thereof, and disulfides.

The material of the anode is not specifically limited as long as it is capable of absorbing and emitting cations, and ones previously known as anode active materials of a secondary battery can be used such as crystalline carbons such as graphitized carbon obtained by heat-treating natural graphite, coal, petroleum pitch and the like at a high temperature, non-crystalline carbons obtained by heat-treating coal, petroleum pitch coke, acetylene pitch coke and the like, and lithium alloys such as metal lithium and AlLi.

Further, according to the present invention, in forming the electrodes, the electrode layers can be formed by mixing these electrode active materials with an appropriate binder or high-performance material. As the binder, a halogen-containing polymer such as poly(vinylidene fluoride) is used. Examples of the high-performance material include conducting polymers such as acetylene black, polypyrrole and polyaniline for securing electron conductivity, polymer electrolytes for securing ion conductivity, and composite bodies thereof.

As the material of the collector, although not specifically limited, for example, a metallic foil or a metallic mesh having high conductivity and excellent malleability is used. As the material of such a collector, for example, an aluminum foil is desirable in the case of the cathode and a copper foil is desirable in the case of the anode. The thickness is, for example, 5 to 50 mm. To these collectors, an active material is bonded by the binder.

As the electrolyte contained in the battery power sources of the present invention, materials previously known as the electrolyte of a secondary battery can be used such as a liquid electrolyte, a polymer solid electrolyte and a polymer gel electrolyte. examples of the salt contained in the electrolyte include alkali metal salts such as Li, K and Na of halogen-containing compound anions such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$ and $(C_2F_5SO_2)_3C^-$. These electrolyte salts can be used alone or in combination.

Examples of the electrolyte solution include aprotic solutions in which the above-mentioned electrolyte salts are dissolved in aprotic solvents such as ethylene carbonate, propylene carbonate, butylene carbonate, dimethyl carbonate, ethyl methyl carbonate, diethyl carbonate, acetonitrile, dimethoxyethane, sulfolane, tetrahydrofuran, g-butyrolactone, N-methyl-2-pyrrolidone and dimethylformamide.

Examples of the polymer solid electrolyte include polyether polymers such as polye(thylene oxide) and poly (propylene oxide) containing the above-mentioned electrolyte salts.

Examples of the polymer gel electrolyte include ones in which the above-mentioned electrolyte salts and solvents cited as examples of the aprotic solvent that can be used for the aprotic electrolyte solution are contained in polymers, for example, fluoropolymers such as poly(vinylidene fluoride), polyhexafluoropropylene and polytetrafluoroethylene; acrylate polymers such as polym(ethyl methacrylate) and poly(methyl acrylate); and polyacrylonitrile. These solvents or polymers can be used alone or in combination. As for the polymers, ones combined by copolymerization or the like can also be used.

As the porous separator, while a micro-porous separator is generally used, woven fabric or non-woven fabric can be used as long as the effect of the present invention is obtained. As the micro-porous separator, for example, one with a hole diameter of 0.1 to 0.5 mm, a hole area rate of 30 to 70 percent and a thickness of 1 to 50 mm can be used. As the material of the separator, polyolefin resins such as polyethylene and polypropylene, and polyester can be used.

When the present invention is applied to a film packed battery, it is desirable that the film used for sheathing the battery power sources be one in which sealing of the periphery can be performed after the battery power sources are placed inside and at least the sealed portion can be heat-sealed. For example, the entire film may be formed of a heat sealable film made of a polyolefin resin such as polyethylene or polypropylene, or when necessary, the film may have a multi-layered structure in which the innermost layer is a resin layer having a heat sealable property.

Desirable Examples or such a multi-layered film include one that comprises at least three layers of a surface protection layer, a metallic layer and a heat sealable layer. As the surface protection layer, a layer of a resin that does not melt at the heat-sealing temperature, for example, poly(ethylene terephthalate), nylon or polyimide is used. As the metallic layer, it is desirable to use a foil of a metal that has few cracks or pinholes and does not allow gases to pass therethrough, for example, aluminum, nickel or gold. While the thickness of the metallic layer is not specifically limited in the present invention, since pinholes are apt to be caused if the intermediate metallic layer is too thin, a thickness in the range of 0.015 to 0.1 mm is generally used. The heat sealable layer is not specifically limited as long as it is not readily affected by the electrolyte solution, has thermoplasticity and can be heat-sealed at a temperature in the range of 150 to 250 C.; polyolefin resins such as polyethylene and polypropylene, polyimide resins and ionomer are used.

Moreover, the adhesion of the thermoplastic resin film and the metallic foil can be increased by using an adhesive layer or by performing a surface modification treatment on the metallic foil.

The manufacturing method of the present invention is usable not only for the manufacture of a secondary battery but also in fields where there is a possibility that deformation or the like is caused when a voltage or a current is applied. In methods of manufacturing an electric double-layered capacitor, an electrolytic capacitor and various sensors, products with excellent stability can be manufactured by forming the products by applying a voltage or a current while applying pressure by the pressing apparatus of the present invention.

EXAMPLES OF THE FIRST ASPECT OF THE INVENTION

Hereinafter, the first aspect of the present invention is explained In detail by means of examples, however, the present invention is not limited to these examples.

Example 1

Cobaltic acid lithium, acetylene black, poly(vinylidene fluoride), and N-methyl-2-pyrrolidone having the average particle diameter of 5 $\mu$m were mixed and dispersed at the weight ratio of 10:1:1:30. The materials were then uniformly coated on one side of an aluminum foil by using a wire bar and vacuum-dried for two hours and the solvent was removed. A thin layer thus obtained was cut into an appropriate size and a cathode layer having a capacity of approximately 25 mAh was manufactured. On this cathode layer, a separator film made of polyethylene having a thickness of 25 $\mu$m and electron hole ratio of 50% were laminated. Thereon, a slurry comprising poly(vinylidene fluoride), N-methyl-2-pyrrolidone (hereafter, NMP), powder petroleum coke, and acetylene black mixed at the weight ratio of 1:30:20:1 was spread, formed to be uniform by a wire bar, and vacuum-dried for two hours at 100° C., and whereby a anode layer was obtained. Subsequently, a copper foil, having the same area as the aluminum foil of the cathode, serving as the collector was placed on the anode layer and wound, and thereto lead terminals are connected, and thereby a electrode laminated member for a lithium ion secondary battery was obtained.

Thereafter, the above mentioned electrode stacked member was sandwiched by a laminated film composed by laminating a nylon film as its surface protection layer and a polypropylene film as its heat sealable layer on the front and back of the aluminum foil having a thickness of 25 $\mu$m, and a range within 1 cm from the outside periphery which was thermally deposited by pressure-fitting a heater bar of 200° C. Here, before the last side was sealed, an electrolyte solution comprised of a ethylene carbonate—propylene carbonate mixed solution (mixing rate 50:50) containing LiPF6 as an electrolyte salt is provided so as to be contained in the battery, and whereby a thin battery before pre-charging was obtained.

The thin battery (uncharged) thus assembled was charged to 4.2 V with a constant current of 112 mA while the pressure of 1 kg/cm$^2$ was applied to both sides of the battery by means of the flat plate, the said battery was then charged at a constant voltage of 4.2 for a total of 10 hours, and thereby the thin battery was completed.

When the thin battery obtained was subjected to a charge and discharge test, the initial discharge capacity was 685 mAh, which accorded with the design, and the discharge capacity after 150 cycles was 625 mA, which meant that the decrease is limited to 10%. Also, the thickness of the battery was increased by 5% after 10 cycles, thereby showing excellent stability.

Example 2

Lithium manganate powder having a spinel structure, a carbon conductivity-adding material and poly(vinylidene fluoride) at a weight ratio of 90:5:5 were mixed with NMP, dispersed and stirred so as to become slurry. The amount of NMP is adjusted so that the slurry had an appropriate viscosity. One surface of an aluminum foil having a thickness of 20 μm serving as the cathode collector was uniformly coated with the slurry by means or a doctor blade, and was vacuum-dried at 100° C. for two hours. Likewise, the other surface of the aluminum foil was coated with the slurry and vacuum-dried. This sheet was roll-pressed to form a cathode active material.

Then, amorphous carbon powder and poly(vinylidene fluoride) at a weight ratio of 91:9 were mixed with the NMP, dispersed and stirred so as to become a slurry. The amount of NMP is adjusted so that the slurry had an appropriate viscosity. One surface of a copper foil having a thickness of 10 μm serving as the anode collector was uniformly coated with the slurry by means of a doctor blade, and was vacuum-dried at 100° C. for two hours. At this time, the theoretical capacity per unit area of the anode layer and the theoretical capacity per unit area of the cathode layer were adjusted so that the ratio therebetween became 1:1. Likewise, the other surface was coated with the slurry and vacuum-dried. This sheet was roll-pressed to form a anode active material layer bonded to both surfaces of the anode collector.

A microporous separator having a three-layer structure of polypropylene, polyethylene and polypropylene (Serugado 2300, manufactured by Hoechst Seranizu) was interposed between the cathode and the anode, and the positive layer, separator, and negative layer were wound up as one body, thereby a electrode laminated member was formed.

In this electrode laminated body, the electrolyte solution was poured in a similar manner to Example 1, thereby obtaining a uncharged thin battery.

The assembled thin battery was charged up to 4.2 V with a constant current of 112 mA while the pressure of 1 kg/cm$^2$, was applied to both sides of the battery by means of the flat plate, the said battery was then charged at a constant voltage of 4.2 for a total of 10 hours, and thereby the thin battery was completed.

Figure 4:
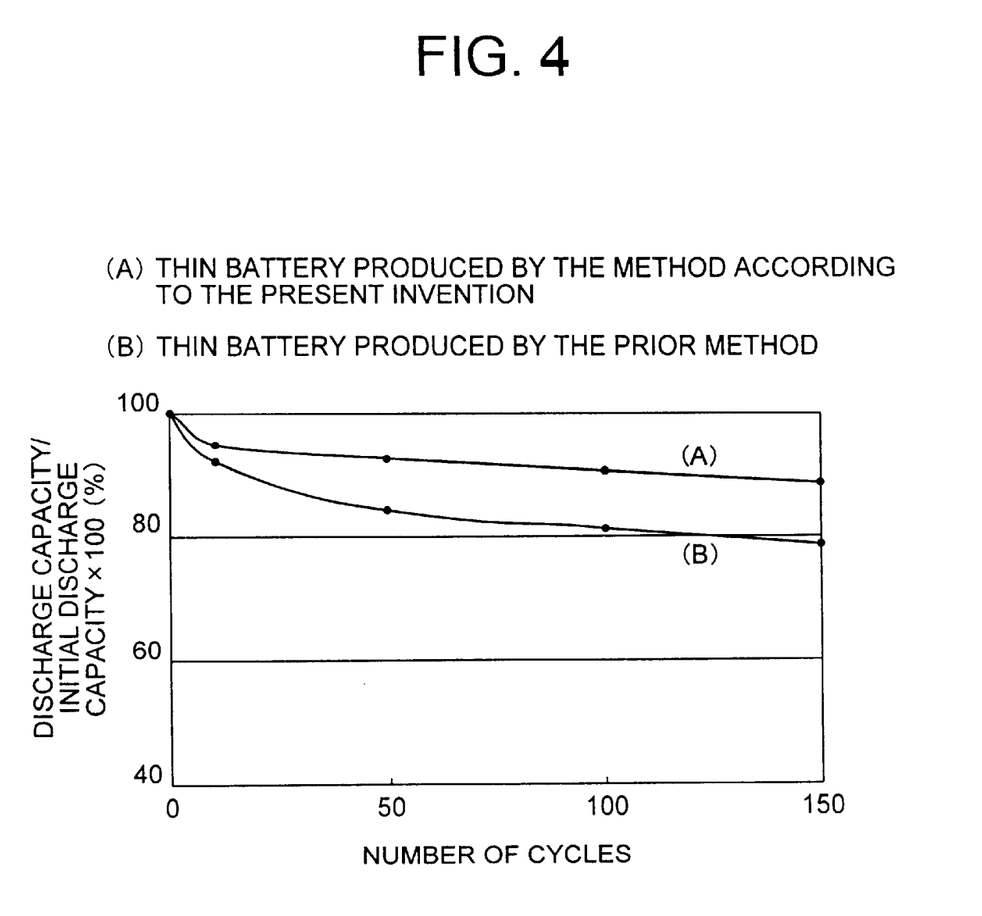
FIG. 4 is a graph showing cycle characteristics of discharge capacity of a battery produced by the method according to the present invention and a battery according to the prior art.
Figure 5:
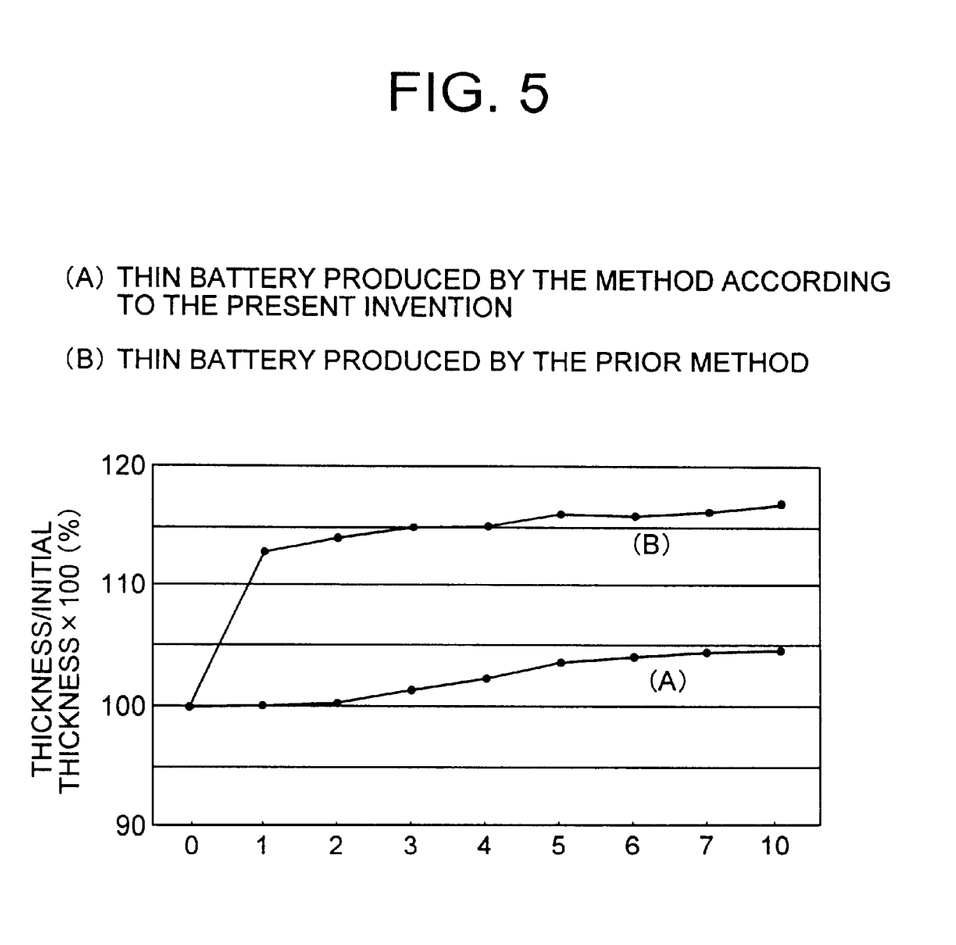
FIG. 5 is a graph comparing cycle dependency of the thickness between a battery produced by the method according to the present invention and battery according to the prior art.

When the thin battery obtained was subjected to a charge and discharge test, as shown in FIG. 4, the initial discharge capacity was 645 mAh, which accorded with the design, and the discharge capacity after 150 cycles was 589 mA, which meant that the decrease is limited to 10%. Also, the thickness of the battery was, as shown in FIG. 5, increased by 5% after 10 cycles, thereby showing excellent stability.

Comparative Example

In Example 2, the battery before pre-charging had been performed was employed as a test sample, and a charge and discharge cycle test was performed without applying pressure to the thin battery. As a result, as shown in FIG. 4, the initial capacity decreased to 400 mAh being 60% of the design value, and the capacity after 150 cycles was 330 mAh. Also, the thickness of the battery was, as shown in FIG. 5, increased by 15% after 10 cycles. Since deformation due to charging and discharging was not uniform, it was considered that detachment between coated surfaces had occurred, thereby resulting in the above-described results.

Moreover, the method for producing a thin battery comprising the step for charging a thin battery composed of a battery power source packed with a film while applying pressure can be applied not only to production of the secondary battery but also to fields where there is a possibility that deformation occurs when voltage or current is supplied, and in methods for producing an electric double-layered capacitor, an electrolytic capacitor, and a sensors of every kind as well, and thus products having excellent stability can be produced by supplying voltage or current while applying pressure.

EXAMPLE OF THE SECOND ASPECT OF THE INVENTION

Hereinafter, the present invention will be concretely described with reference to examples. However, the present invention is not limited to the examples.

Third Example

Lithium manganate powder having a spinel structure, a carbon conductivity-adding material and. poly(vinylidene fluoride) at a weight ratio of 90:5:5 were mixed with NMP, dispersed and stirred so as to become slurry. The amount of NMP is adjusted so that the slurry had an appropriate viscosity. One surface of a 20-mm-thick aluminum foil serving as the cathode collector was uniformly coated with the slurry by use of a doctor blade, and was vacuum-dried at 100 C. for two hours. Likewise, the other surface of the aluminum foil was coated with the slurry and vacuum-dried. This sheet was roll-pressed to form a cathode active material. The theoretical capacity was 600 mAh.

Then, amorphous carbon powder and poly(vinylidene fluoride) at a weight ratio of 91:9 were mixed with the NMP, dispersed and stirred so as to become slurry. The amount of NMP is adjusted so that the slurry had an appropriate viscosity. One surface of a 10-mm-thick copper foil serving as the anode collector was uniformly coated with the slurry by use of a doctor blade, and was vacuum-dried at 100 C. for two hours. At this time, the theoretical capacity per unit area of the anode layer and the theoretical capacity per unit area of the cathode layer were adjusted so that the ratio therebetween is 1:1. Likewise, the other surface was coated with the slurry and vacuum-dried. This sheet was roll-pressed to form a anode active material layer bonded to both surfaces of the anode collector.

A microporous separator having three-layer structure of polypropylene, polyethylene and polypropylene (serugado 2300, manufactured by Hoechst Seranizu) was interposed between the cathode and the anode, wound up by use of an elliptical winding core, and heat-pressed, thereby obtaining a thin elliptical electrode winding body.

On the other hand, from a laminated film having a structure in which polypropylene resin (sealing layer, thickness 70 mm), polyethylene terephthalate (20 mm), aluminum (50 mm) and polyethylene terephthalate (20 mm) were superimposed in this order, two pieces of a predetermined size were cut out, and on a portion of one of the pieces, a concave was formed that had a bottom surface portion and a side surface portion matching the size of the electrode winding body. These pieces were opposed so as to surround the electrode winding body, and the periphery was heat-sealed, thereby forming a film packed battery of a configuration as schematically shown in FIGS. 2 and 3. A cathode lead 23 and an anode lead 24 (sometimes referred to as electrode leads together) were connected to the electrode winding body in advance, and when the periphery of the electrode winding body was heat-sealed, the electrode winding body was sandwiched between the laminated films 21 with the electrode leads being drawn out, and this portion is heat-sealed. Before the last side was heat-sealed, the electrode winding body was impregnated with the electrolyte solution. The last side was other than the electrode lead heat-sealed portion. The electrode winding body impregnated with the electrolyte solution corresponds to the battery power sources 22 in FIG. 2 The electrolyte solution had LiPF$_6$ of 1M as the supporting electrolyte and had a solvent of a mixture of propylene carbonate and ethylene carbonate (weight ratio 50:50) as the solvent. In this manner, four film packed batteries with a thickness of approximately 3.6 mm and a theoretical capacity of 600 mAh were formed.

Then, the pressing apparatus of the present invention was assembled as shown in FIG. 1. On the lower pressing plate 12 made of an aluminum plate with a thickness of 5 mm, the four film packed batteries were placed in two rows and two columns, a 0.2-mm-thick metallic sheet of stainless steel having a size that covers the four batteries was placed thereon, and a 5-mm-thick porous rubber sheet was placed thereon. This rubber sneet has a hardness such that a shrinkage of 0.5 mm is caused for the application of a stress of $1\times10^{-3}$N/m$^2$. Then, the upper pressing plate made of an aluminum plate with a thickness of 5 mm was placed with spacers in between, and screwing was performed. The thickness of the spacers was smaller by 0.3 mm than the natural thickness of the lamination of the batteries, the metallic sheet and the rubber sheet under this condition, the film packed batteries were pressed. To the electrode leads of the batteries, a terminal from a charge and discharge apparatus was connected in advance.

Under this pressured condition, each battery was charged to 4.2 V with a constant current of 112 mA and was then charged at a constant voltage of 4.2 V for a total of ten hours, thereby performing pre-charging.

Fourth Example

Four film packed batteries were formed in a manner similar to the third example, and pre-charging was performed in a manner similar to the third example except that the metallic sheet in the third example was not provided. The spacers of the pressing apparatus were smaller by 0.2 mm than those of the third example.

Third Comparative Example

Four film packed batteries were formed in a manner similar to the third example, and pre-charging was performed in a manner similar to the third example except that the metallic sheet and the rubber sheet in the third example were not provided. The spacers of the pressing apparatus were smaller by 5.2 mm than those of the third example.

Fourth Comparative Example

Four film packed batteries were formed in a manner similar to the third example, and each battery was charged to 4.2 V with a constant current of 112 mA under a released state without being pressed. Then, pre-charging was performed at a constant voltage of 4.2 V for a total of ten hours.
Evaluation of Batteries and Results The batteries on which pre-charging was performed by the above-described methods were detached from the pressing apparatus, and a charge and discharge cycle test was performed at 20 C. in 100 cycles. Charging was performed to 4.2 V with 600 MA. Discharging was performed to 3.0 V with 600 mA. Results of measurement of the thickness and capacity of the batteries and results of observation of the battery surface flatness before and after the cycle test are shown in TABLE 1. The minimum values and the maximum values of the four batteries are shown in the TABLE 1.

TABLE 1

|  | Third example | Fourth example | Third comparative example | Fourth comparative example |
| --- | --- | --- | --- | --- |
| Battery thickness after pre-charging | 3.5 mm –3.61 mm | 3.5 mm –3.6 mm | 3.4 mm –3.5 mm | 3.8 mm –4.1 mm |
| Battery thickness after 100 cycles | 3.7 mm –3.8 mm | 3.8 mm –3.9 mm | 3.7 mm –3.8 mm | 4.0 mm –4.3 mm |
| Battery capacity after 100 cycles | 536 mAh –540 mAh | 532 mAh –540 mAh | 500 mAh –520 mAh | 510 mAh –530 mAh |
| Battery surface flatness after 100 cycles | Excellent | Slight inequalities are present | Excellent | Obvious inequalities are recognized |

In the battery thickness after pre-charging and the battery thickness after the cycle test, the third and the fourth examples in which pre-charging was performed by use of the pressing apparatus of the present invention were smaller than the fourth comparative example in which pre-charging was performed without pressing being performed In the battery capacity after the cycle test, the third and the fourth examples were higher than the third and the fourth comparative examples. These results show that by performing pre-charging while performing pressing, expansion of the battery during use thereafter and the capacity deterioration can be suppressed. In the third comparative example, although expansion was suppressed, the capacity deterioration was not suppressed. Although details of causes thereof are not clear, the following is considered: Since the film packed batteries were directly sandwiched between the upper and the lower pressing plates fixed at a predetermined interval without any buffer layer being provided, as the batteries were charged, a force for the batteries to expand acted to gradually increase the pressing force, so that an excessive pressure was applied to the battery power sources to damage the electrode layers and the separator. While the capacity variations (the difference between the minimum value and the maximum value of the four batteries) of the third and the fourth comparative examples were 20 mAh, the variations were suppressed to 4 to 8 mAh in the third and the fourth examples. It is considered that a reason therefor is as follows: The electrode close contact condition and the thickness of the electrode winding body varied among the batteries at first, and while the variations appeared as it was in the third and the fourth comparative examples, in the third and the fourth examples in which pre-charging was performed by use of the pressing apparatus of the present invention, the characteristic variations were reduced because pressure is applied in accordance with thickness variations among the batteries at the time of the pre-charging. In the third comparative example, it is considered that since no buffer layer was provided, the thickness differences among the batteries caused differences among the pressures applied to the batteries and since the pressing effect varied among the batteries as a consequence, the capacity variations were larger than those of the examples. Moreover, comparing the third and the fourth examples, in the degree of suppression of battery capacity variations, the degree of suppression of battery expansion and the surface flatness after the cycle test, the third example was more excellent than the fourth example. It is considered that this is because local expansion of the electrode winding bodies during the pre-charging could be suppressed by placing the metallic sheet between the rubber sheet and the film packed batteries.

According to the present Invention, a prismatic battery can be provided that is excellent in stability and in which deformation due to charge and discharge is small and the possibility of deformation and breakage of the battery is low even when the internal pressure is high.

In particular, even when pressured charging is simultaneously performed on a plurality of batteries, pressure can be applied in accordance with the thickness variations among the batteries, so that battery characteristic variations after pressing can be reduced. Moreover, since the means therefor can be realized by use of a pressing apparatus of a simple structure, the present invention is advantageous in cost.

Moreover, according to the present invention, since suppression of a small-scale deformation of a battery such as a local expansion in a battery (battery flatness.) and flexible handling of thickness differences among separate parts such as thickness differences among batteries are compatible with each other, battery characteristic variations and flatness during use can be simultaneously satisfied.

What is claimed is:

1. A method for producing a film packed battery comprising a battery power source having, at least, a cathode, an anode, an electrolyte, and a separator and packed with a film, comprising at least one precharging step of pre-charging said battery power source while pressure is applied to the battery power source using hydrostatic pressure provided by an insulation liquid.

2. A method for producing a film packed battery according to claim 1, wherein the pressure applied in said pre-charging step is 0.05 MPa or more.

3. A method for producing a film packed battery according to claim 1, wherein said cathode and anode are wound.

4. A method for producing a film packed battery comprising a battery power source having, at least, a cathode, an anode, an electrolyte, and a separator and packed with a film, comprising at least one pre-charging step of pre-charging said battery power source while pressure is applied by a pair of pressing plates having a buffer layer at least on one of said pressing plates, wherein said buffer layer comprises at least two layers including a hard layer and a resilient layer, and said hard layer is disposed so as to be in contact with said battery, said resilient layer is a rubber resilient member in sheet form, and said hard layer is made of a metal sheet or a sheet of resin.

5. A method for producing a film packed battery comprising a battery power source having, at least, a cathode, an anode, an electrolyte, and a separator and packed with a film, comprising at least one pre-charging step of pre-charging said battery power source while pressure is applied, wherein a pressing method in said pre-charging step utilizes hydrostatic pressure and, wherein the battery, before a preparatory charge, is placed in an insulation liquid by a method utilizing hydrostatic pressure.

6. A method of manufacturing a prismatic battery, comprising at least one pre-charging step in which at least one prismatic battery is sandwiched between a pair of pressing plates having a buffer layer at least on one of said pressing plates, and under a condition where an interval between said pressing plates is fixed at a predetermined interval that enables pressing of said prismatic battery, said prismatic battery is charged while pressure is being applied to said prismatic battery, wherein said buffer layer comprises at least two layers of a high hardness layer and a low hardness layer, and said high hardness layer is disposed so as to be in contact with said prismatic battery and, wherein said low hardness layer is a rubber resilient member in a sheet form, and said high hardness layer is made of a metal sheet or a resin sheet.

7. A method of manufacturing a prismatic battery according to claim 6, wherein said prismatic battery is a battery in which battery power sources are packed with a film.

8. A method of manufacturing a prismatic battery according to claim 6, wherein said prismatic battery contains a aprotic electrolyte solution.

9. A method of manufacturing a prismatic battery according to claim 6, wherein said prismatic battery contains a polymer solid electrolyte or a polymer gel electrolyte.

10. A method of manufacturing a prismatic battery according to claim 6, wherein said prismatic battery has battery power sources comprising a cathode and an anode that are wound into a flattened configuration with a separator in between.

11. A method of manufacturing a prismatic battery according to claim 6, wherein a plurality of prismatic batteries is sandwiched between said pair of pressing plates.

12. A method of manufacturing a prismatic battery according to claim 6, wherein said low hardness layer is selected from the group consisting of urethane rubber, expanded urethane rubber, fluororubber copolymer, silicone rubber, silicon sponge rubber, natural rubber, chloroprene rubber, nitrile rubber and acrylic rubber.

13. A method of manufacturing a prismatic battery according to claim 6 wherein said high hardness layer is a metal sheet.

14. A method of manufacturing a prismatic battery according to claim 6, wherein said high hardness layer is a resin sheet.

15. A method of manufacturing a prismatic battery according to claim 14 wherein said high hardness layer is a resin sheet made of a material selected from the group consisting of polyester, polypropylene, polyethylene, acrylic resin and silicone resin.

* * * * *